United States Patent
Tanaka

(10) Patent No.: US 11,686,591 B2
(45) Date of Patent: Jun. 27, 2023

(54) INFORMATION PROCESSING APPARATUS, INFORMATION PROCESSING METHODS AND INFORMATION PROCESSING SYSTEM

(71) Applicant: Toyota Jidosha Kabushiki Kaisha, Toyota (JP)

(72) Inventor: Yurika Tanaka, Yokosuka (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 149 days.

(21) Appl. No.: 17/130,396

(22) Filed: Dec. 22, 2020

(65) Prior Publication Data

US 2021/0199456 A1  Jul. 1, 2021

(30) Foreign Application Priority Data

Dec. 26, 2019  (JP) .............................. JP2019-237111

(51) Int. Cl.
*G01C 21/34* (2006.01)
*G08G 1/123* (2006.01)
*G08G 1/0968* (2006.01)

(52) U.S. Cl.
CPC ..... *G01C 21/3492* (2013.01); *G01C 21/3484* (2013.01); *G08G 1/096827* (2013.01); *G08G 1/096844* (2013.01); *G08G 1/123* (2013.01)

(58) Field of Classification Search
CPC ............ G01C 21/3492; G01C 21/3484; G01C 21/3453; G08G 1/096827; G08G 1/096844; G08G 1/123
See application file for complete search history.

(56) References Cited

U.S. PATENT DOCUMENTS

| 2003/0112139 | A1* | 6/2003 | Matsui | ............... G08B 13/2491 340/521 |
|---|---|---|---|---|
| 2004/0181337 | A1 | 9/2004 | Kawasaki et al. | |
| 2015/0006617 | A1 | 1/2015 | Yoo et al. | |
| 2018/0018635 | A1* | 1/2018 | Suzuki | ............... G06Q 10/1093 |
| 2019/0128694 | A1* | 5/2019 | Matsushita | ............ G06V 20/56 |

FOREIGN PATENT DOCUMENTS

| JP | 2004-294429 A | 10/2004 |
|---|---|---|
| JP | 2015011699 A | 1/2015 |

* cited by examiner

*Primary Examiner* — Rami Khatib
*Assistant Examiner* — Shahira Baajour
(74) *Attorney, Agent, or Firm* — Dinsmore & Shohl LLP

(57) ABSTRACT

An information processing apparatus of this application includes a controller. The controller is configured to execute: identifying a behavior pattern of a user using a behavior model of the user, the behavior model being generated based on past behavior information of the user detected by a sensor capable of detecting the behavior information of the user, predicting a scheduled arrival time, which is an arrival time of the user at a building to which the user travels, based on the identified behavior pattern of the user, and providing information to the user regarding the movement to the building so that the user can arrive at the building by the predicted scheduled arrival time.

12 Claims, 13 Drawing Sheets

FIG.7
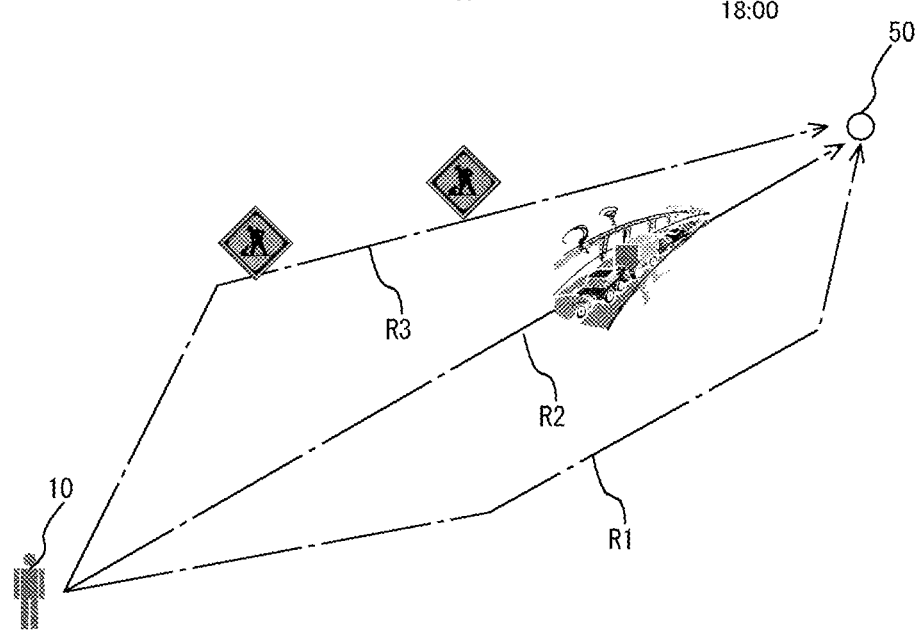
SCHEDULED HOME RETURN TIME
18:00
PRESENT TIME
16:30
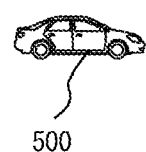

FIG.8

| | RETURN ROUTE | MEANS | DEPARTURE TIME | TRAFFIC INFO | DELAY POSSIBILITY |
|---|---|---|---|---|---|
| | | | MOVING DATA FOR RETURN HOME | SCHEDULED ARRIVAL TIME 18:00 | |
| ☐ | R1 | VEHICLE | 17:15 | NONE | LOW |
| ☐ | R2 | VEHICLE | 16:40 | TRAFFIC CONGESTION | HIGH |
| ☐ | R3 | VEHICLE | 17:00 | ROAD CONSTRUCTION | MIDDLE |
| | RAILWAY X | RAILWAY | 16:45 | NONE | LOW |

PRESS BUTTON FOR ARRANGMENT OF VEHICLE

[ ARRANGE ]

FIG.10

```
         MOVING DATA
       FOR RETURN HOME (1) SCHEDULED ARRIVAL TIME 18:00

RETURN ROUTE   MEANS    DEPARTURE TIME   TRAFFIC INFO        DELAY POSSIBILITY
 ☐      R1        VEHICLE       17:15            NONE                  LOW

☐      R2        VEHICLE       16:40       TRAFFIC CONGESTION         HIGH (2) SCHEDULED ARRIVAL TIME 20:00

RETURN ROUTE   MEANS    DEPARTURE TIME   TRAFFIC INFO        DELAY POSSIBILITY
 ☐      R1        VEHICLE       19:15            NONE                  LOW

☐      R2        VEHICLE       19:30            NONE                  LOW

PRESS BUTTON FOR ARRANGMENT OF VEHICLE
                        [ ARRANGE ]
```

*FIG.11*

| DATE | DAY OF WEEK | VISITING FACILITY | STAY TIME |
|---|---|---|---|
| d1 | WEEKDAY A | FACILITY X | $\Delta t1$ |
| d2 | WEEKDAY B | FACILITY Z | $\Delta t3$ |
| d3 | WEEKDAY A | FACILITY Y | $\Delta t2$ |
| d4 | WEEKDAY A | FACILITY X | $\Delta t1$ |
| d5 | WEEKDAY A | FACILITY Y | $\Delta t2$ |
| d6 | WEEKDAY B | FACILITY Z | $\Delta t3$ |
| d7 | WEEKDAY A | FACILITY Z | $\Delta t3$ |
| d8 | WEEKDAY A | FACILITY X | $\Delta t1$ |

FIG.13

```
          MOVING DATA          SCHEDULED ARRIVAL TIME 18:00
          FOR RETURN HOME

RETURN ROUTE   MEANS    DEPARTURE TIME    FACILITY        VISITING TIME

☐     R1      VEHICLE       17:15       FACILITY X & Y       20 MIN

☐     R2      VEHICLE       16:40          NONE               NONE

☐     R3      VEHICLE       17:00       FACILITY Z           10 MIN

PRESS BUTTON FOR ARRANGMENT OF VEHICLE
                            [ ARRANGE ]
```

INFORMATION PROCESSING APPARATUS, INFORMATION PROCESSING METHODS AND INFORMATION PROCESSING SYSTEM

CROSS-REFERENCE TO RELATED APPLICATIONS

This application is based upon and claims the benefit of priority of the prior Japanese Patent Application No. 2019-237111, filed on Dec. 26, 2019, which is hereby incorporated by reference herein in its entirety.

FIELD

The present disclosure relates to an information processing apparatus, an information processing method, and an information processing system.

BACKGROUND

Patent Document 1 discloses a technique related to an information presentation device that searches for a return route in time for a return time desired by a user and presents it to the user. Specifically, the in-vehicle information device is configured to input in advance a return time desired by the user to the in-vehicle information device mounted on the vehicle, calculate a departure time and a return route for returning to the desired return time based on the current position and the residence position, and present the departure time and the return route to the user by the departure time.

[Patent Document 1] Japanese Patent Application Laid-Open Publication No. 2004-294429

SUMMARY

It is an object of the present disclosure to provide the user with information on the movement to a predetermined building without the user inputting a desired time or the like to arrive at the predetermined building, thereby enhancing the convenience of the user.

An information processing apparatus of this application comprises a controller, and the controller is configured to execute: identifying a behavior pattern of a user using a behavior model of the user, the behavior model being generated based on past behavior information of the user detected by a sensor capable of detecting the behavior information of the user, predicting a scheduled arrival time, which is an arrival time of the user at a building to which the user travels, based on the identified behavior pattern of the user, and providing information to the user regarding the movement to the building so that the user can arrive at the building by the predicted scheduled arrival time.

An information processing method executed by a computer of this application includes: identifying a behavior pattern of a user using a behavior model of the user, the behavior model being generated based on past behavior information of the user detected by a sensor capable of detecting the behavior information of the user; predicting a scheduled arrival time, which is an arrival time of the user at a building, based on the identified behavior pattern of the user; and providing the user with information regarding the movement to the building so that the user can arrive at the building by the predicted scheduled arrival time.

An Information processing system of this application comprises: a first device configured to collect behavior information of a user detected by a sensor provided in a building; a second device configured to generate a behavior model of the user based on the behavior information collected in the first device; and an information processing apparatus having a controller, and the controller is configured to execute: identifying a behavior pattern of the user using the behavior model generated by the second device, predicting a scheduled arrival time of the user to arrive at a building based on the identified behavior pattern of the user, and providing the user with information regarding the movement to the building so that the user can arrive at the building by the predicted scheduled arrival time.

According to the present disclosure, it is possible to provide the user with information on the movement to a predetermined building without the user inputting a desired time or the like to arrive at the predetermined building, thereby enhancing the convenience of the user.

BRIEF DESCRIPTION OF THE DRAWINGS

FIG. 7 is a first diagram for explaining a travel route to a home provided to a user;

FIG. 8 is a diagram showing a first exemplary mobile information provided to mobile terminal of the user;

FIG. 10 is a diagram showing a second example of the moving information provided to the user's mobile terminal;

FIG. 11 is a diagram illustrating information about the behavior of the user detected by mobile terminal owned by the user;

FIG. 13 is a diagram showing a third example of the moving information provided to the user's mobile terminal.

DETAILED DESCRIPTION

Figure 1:
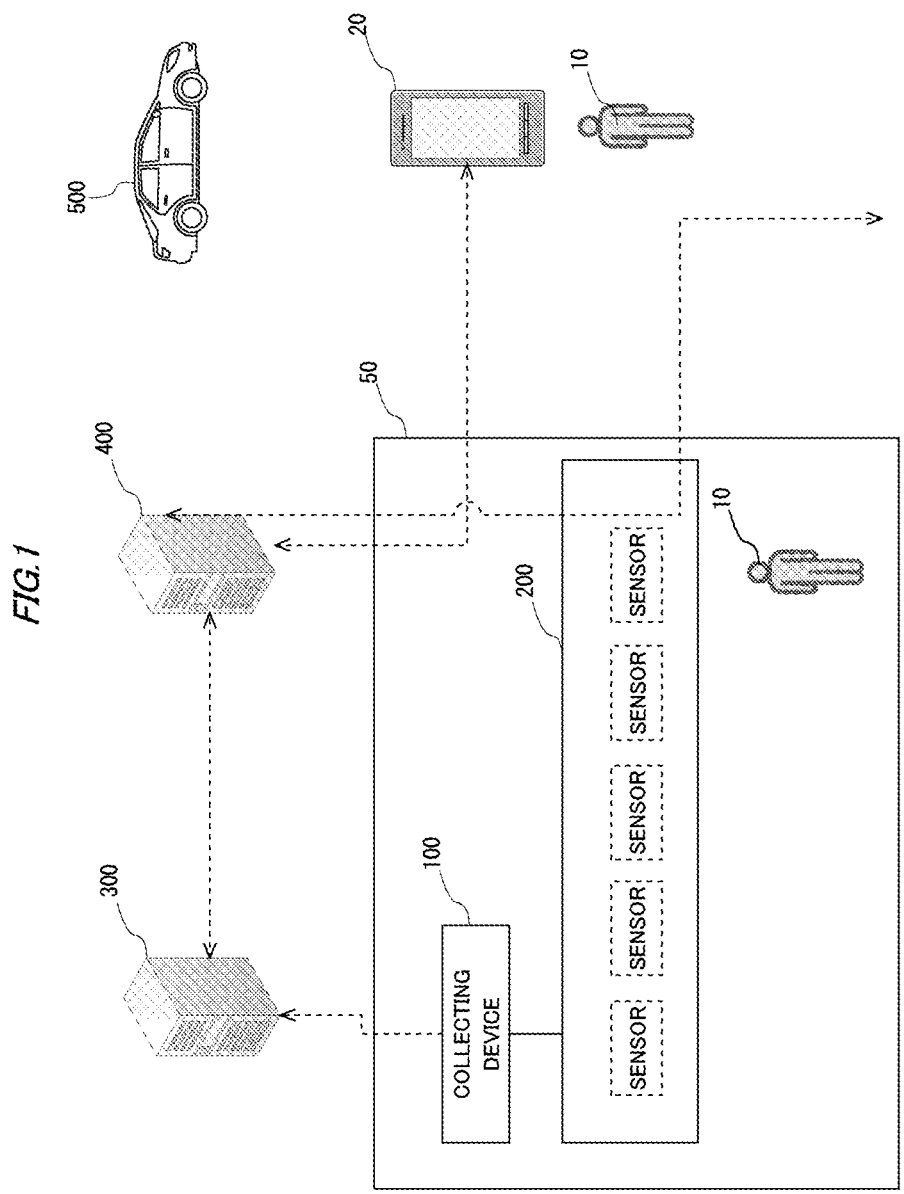
FIG. 1 is a diagram showing a schematic configuration of an information processing system.

In the present disclosure, sensors may be installed in the building or may be disposed outside the building (e.g., a mobile terminal carried by the user) where the sensors can detect behavior information of the user. The sensors may detect the position of the user (e.g., in which room, etc.), or may detect the behavior of the user (e.g., sleeping, waking, eating, washing, etc.). The sensors may detect that a predetermined device in the building is used. Here, behavior information is information about the behavior of the user and may be data representing the location of the user and/or the usage of predetermined device in the building by the user in chronological order. For example, behavior information may be time series data indicating which room in the building the user is in, or may be time series data indicating which device in the building the user has used, e.g., computers or appliances. It may also be a combination of these.

A behavior model is a model representing a behavior pattern relating to a user movement in buildings, and may be a model including a plurality of user behavior patterns. The behavior model is generated based on the user's previous behavior information detected by the sensors. Then, controller of an information processing apparatus disclosed in the present disclosure uses the behavior model to identify the behavior pattern of the user at that time. The controller may identify the user's behavior patter using the behavior model based on, for example, the user's present position, present time, etc. In general, a user (person) often decides a routine of daily life. The movement to a predetermined building of the user may be incorporated into the user's routine. Controller may predict a scheduled arrival time at the buildings to which the user moves according to the identified behavior pattern.

The controller provides the user with information on moving to buildings (hereinafter referred to as "movement information"). The movement information is information about the user's movement to the building and is information that allows the user to arrive at the building by the predicted scheduled arrival time. For example, information relating to a departure time (moving start time) for an arrive at a destination at a scheduled arrival time, a means for moving, a route through which the vehicle travels at the time of moving, and the like may be exemplified as moving information. As described above, according to the information processing apparatus disclosed in the present disclosure, the information processing apparatus predicts scheduled arrival time at the user's premises by using the user's behavior pattern and provides the moving information without requiring the user to enter particular information into the information processing apparatus. Therefore, a convenient service is provided to the user.

Embodiments of the present disclosure will be described below with reference to the drawings. The configuration of the following embodiment is exemplary, and the present disclosure is not limited to the configuration of the embodiment.

First Embodiment

An outline of an information processing system according to the first embodiment will be described referring to FIG. 1. The information processing system according to this embodiment includes a collecting device 100 serving a predetermined building (e.g., user's home) 50 related with the user 10, a sensor group 200 including a plurality of sensors sensing the behavior of the user 10 in the building, a collecting server 300 communicatively coupled with the collecting device 100, and a server 400 providing mobile information to the user 10 with respect to travel to the building 50. Here, the "predetermined building related with the user 10" is a building in which the user 10 behaves at a certain frequency, that is, where a behavior model of the user 10 can be generated, which will be described later, and is assumed to be the home of the user 10 as an example in the present embodiment. Therefore, the user 10 performs a daily life in the building 50, which means an association between the building 50 and the user 10. Also, in FIG. 1, two users 10 are described, which simultaneously describes a state in which the user 10 stays inside the building 50 and a state in which the user 10 stays outside the building 50, and the user 10 in FIG. 1 is the same person.

The collecting device 100 according to the first embodiment is a device installed in the building 50 and collects data detected by the sensors included in a group of sensors 200.

Data collection from each sensor by the collecting device 100 may collect data temporarily stored in each sensor at a constant period, and may collect detection data transmitted in a push type from each sensor each time. The collecting device 100 associates the collected detection data with the user 10 who is the owner of the building 50. This allows the detected data collected by the collecting device 100 to be sent to the collecting server 300 in such a way that it is understood that the detection data is associated with the user 10.

The group of sensors 200 includes a plurality of sensors installed in the home. The plurality of sensors may be of any type as long as they can detect the behavior of the user 10 in the building 50. For example, it may detect where the user 10 is located in the building 50, or it may detect what the user 10 is doing in the building 50.

The collecting server 300 is a device for collecting detection data transmitted from the collecting device 100. Although not shown, the collecting server 300 is configured to also collect detection data gathered in other buildings associated with a different user than the user 10. Therefore, the collecting server 300 collects the detection data in such a way that it can identify which user the detection data is associated with.

The server 400 is then communicatively coupled to collecting server 300. The server 400 is a device that generates the behavior model of the user 10 from the detection data associated with the user 10 collected at the collecting server 300 and uses the behavior model to provide the user 10 with travel information regarding the movement of the user 10 to the building 50. In the present embodiment, it is assumed that the movement information is provided from the server 400 to the mobile terminal 20 of the user 10. The server 400 is also a device that transmits a command to the vehicle 500 in order to arrange the automated-driving vehicle 500 to the user 10 based on a response from the user 10 to the provided movement information. In the present embodiment, a plurality of vehicles 500 are under the management of the server 400 and run based on commands received from the server 400.

In the present embodiment, the home of the user 10 is exemplified as the building 50, but any other building may be used as long as the user 10 is active at a certain frequency. For example, the building 50 may be a facility of a company where the user 10 works.

Figure 2:
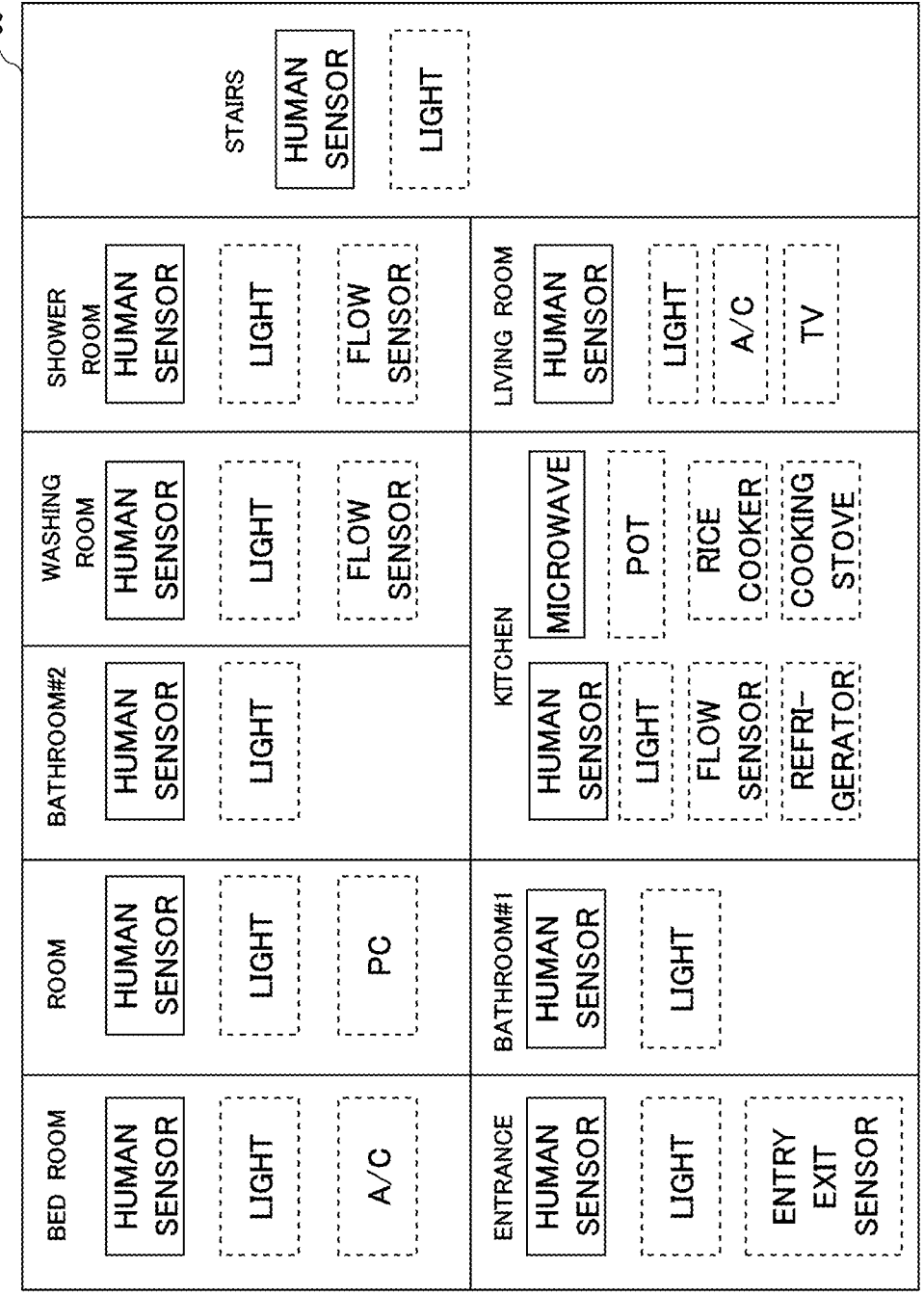
FIG. 2 is a diagram illustrating a plurality of sensors disposed in the house.

Here, the group of sensors 200 provided in the building 50, which is the home of the user 10, will be described with reference to FIG. 2. FIG. 2 is a diagram illustrating a plurality of sensors installed in a building 50. As illustrated, in the present embodiment, a plurality of sensors are installed in the home of the user 10. The sensors include human sensors installed in each room (shown in solid lines), devices related with the sensors installed in each room (hereinafter, sensor devices, shown in dotted lines), a sensor for detecting the entry and exit of the user 10 to the building 50 (hereinafter, the entry and exit detection sensor shown in a solid line). The human sensor can identify where the user 10 is in the home. The device sensor can also identify which device the user 10 is using in the home. In addition, the entry and exit detection sensor can detect that the user 10 has left his/her home.

The human sensor is a sensor for detecting the presence of a person. The human sensor may be, for example, an infrared sensor, or may be a device that determines the presence or absence of a person based on an image obtained by capturing an image of the interior of the building 50 or sound collected by a microphone.

The device sensor is a sensor located within the building 50 to acquire the utilization of predetermined device utilized by the user 10. The device sensor may be built in the device or may indirectly detect the use of the device. For example, a distance sensor built into the device may detect that the user 10 is in front of the device, or a sensor that detects energization may detect that the device is being utilized. The software running on the device may also detect that a particular operation has been performed by the user 10. The target of sensing by the device sensor is not limited to a specific one. For example, a sensor built in the television may detect that the television is on, or may detect that a specific channel is on. Further, the sensor incorporated in the rice cooker may detect that the rice cooking switch has been pressed, or it may detect that the lid has been opened or closed.

The entry and exit detection sensor is a sensor for detecting the exit of the user 10 from the building 50 and the entrance to the building 50. The entrance/exit detection can be performed, for example, via a sensor provided in the entrance door. For example, it is possible to detect the entrance and exit of the user 10 by acquiring the opening and closing states of the door and the locked state. The entrance/exit detection may be performed based on an image. For example, the entrance/exit can be detected by a camera installed in the entrance hall. The entry and exit detection sensor is not necessarily provided in the building 50. For example, the position information may be acquired from mobile terminal 20 held by the user 10, and it may be determined that the user leaves the room when mobile terminal 20 leaves the building 50, while it may be determined that the user enters the room when mobile terminal 20 approaches the building 50. These sensors are connected to collecting device 100, and detection data is collected by collecting device 100.

Figure 3:
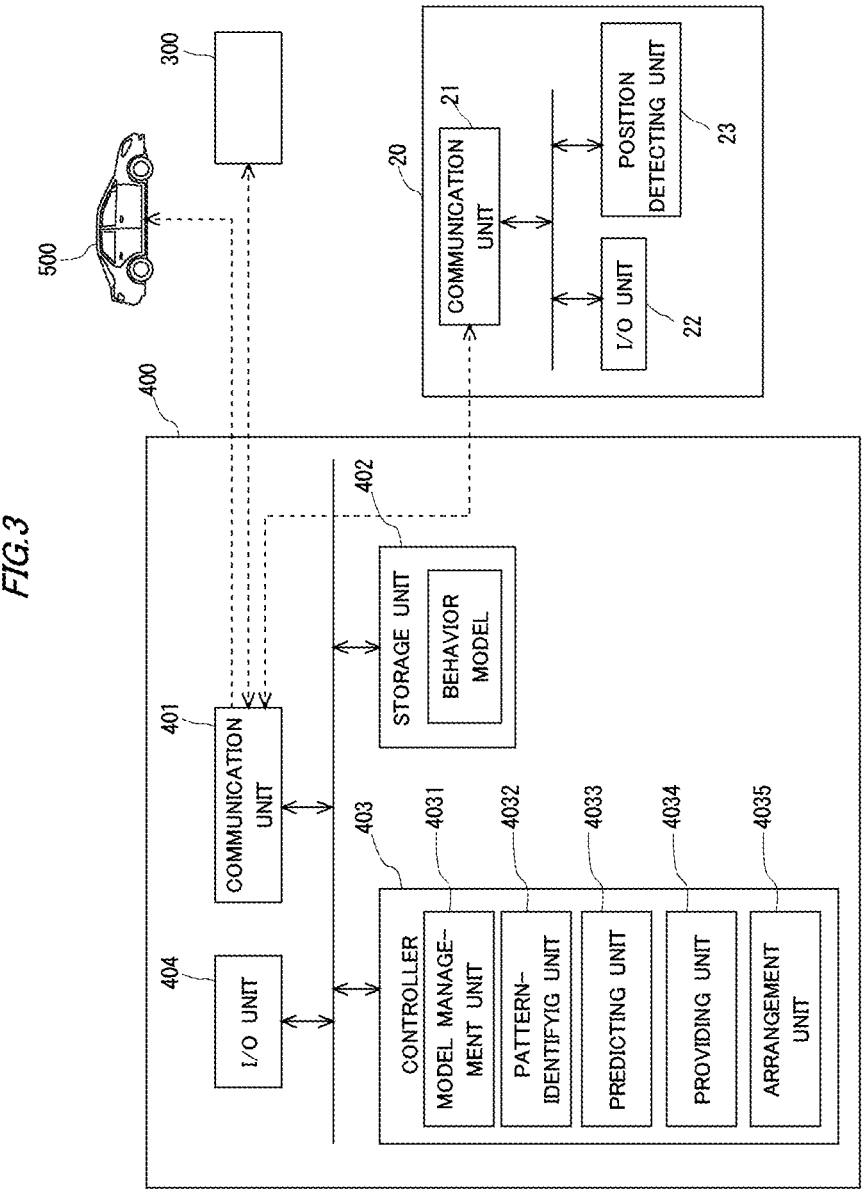
FIG. 3 shows the components of information processing system in more detail.

Next, the components of the server 400 will be mainly described in detail with reference to FIG. 3. FIG. 3 is a diagram showing in more detail the components of the server 400 included in information processing system according to the present embodiment, and also showing the components of mobile terminal 20 of the user 10 receiving the movement data from the server 400.

The server 400 may be comprised of a general-purpose computer. That is, the server 400 may be configured as a computer having a processor such as a CPU or a GPU, a main storage device such as a RAM or a ROM, an EPROM, a hard disk drive, and an auxiliary storage device such as a removable medium. The removable media may be, for example, a USB memory or a disc recording medium such as a CD or DVD. The auxiliary storage device stores an operating system (OS), various programs, various tables, and the like. The server 400 includes a communication unit 401, a storage unit 402, a controller 403, and an input/output unit 404 as functional units, and loads and executes programs stored in the auxiliary storage device in the work area of the main storage device, and controls the functional units through the execution of the program, thereby realizing functions that match a predetermined purpose in each functional unit. However, some or all of the functions may be realized by hardware circuits such as an ASIC and a FPGA.

Here, the communication unit 401 is a communication interface for connecting the server 400 to a network. The communication unit 401 includes, for example, a network interface board and wireless communication circuits for wireless communication. The server 400 is communicatively coupled via the communication unit 401 to collecting server 300, the vehicle 500, the mobile terminal 20 and other external devices.

The storage unit 402 includes a main storage device and an auxiliary storage device. The main memory device is a memory in which a program executed by the controller 403 or data used by the control program is expanded. The auxiliary storage device is a device in which a program executed in the controller 403 and data used by the control program are stored.

In addition, the storage unit 402 stores a behavior model. The behavior model is a model representing a typical behavior pattern of the user's movement to the building 50. The behavior pattern included in the behavior model is not limited to the behavior of the user 10 inside the building 50, but may relate to the behavior of the user 10 outside the building 50. The behavior model is generated based on the history of actions taken by the user. The behavior pattern represented by the behavior model can be used to predict the movement of the user 10 to the building 50. The behavior model may be directly associated with the time of arrival of the user 10 at the building 50, or the behavior model may be generated so that a scheduled arrival time can be inferred. The behavior model may be automatically generated based on the detection data of the user 10 detected by the group of sensors 200. Machine-learning may be used when automatically generating the behavior model.

The controller 403 is a functional unit that controls the server 400. The controller 403 can be realized by a processor such as a central processing unit. The controller 403 further includes five functional units: a model management unit 4031, a pattern identifying unit 4032, a predicting unit 4033, a providing unit 4034, and an arrangement unit 4035. Each functional unit may be realized by executing a stored program by the CPU.

Figure 4:
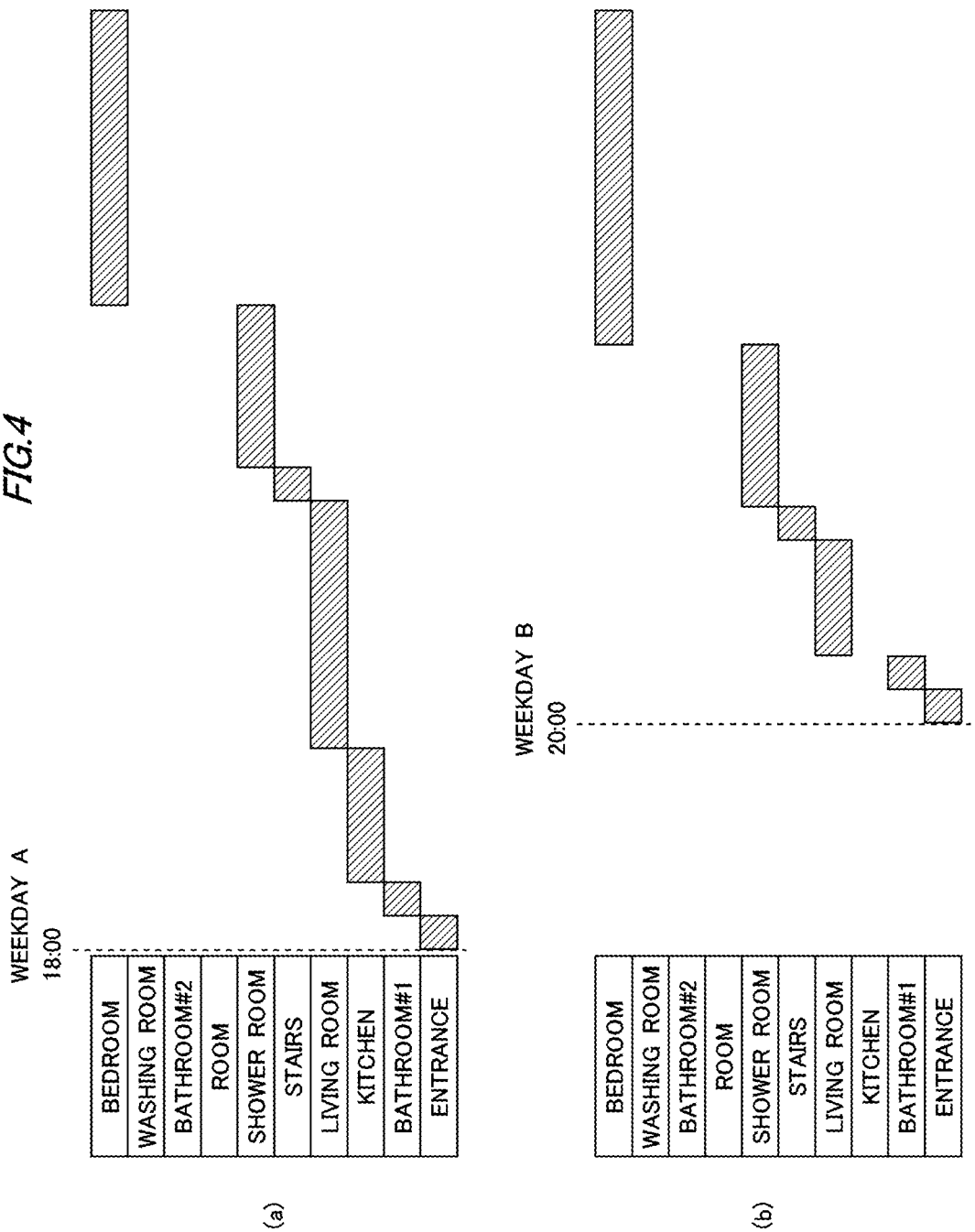
FIG. 4 is a diagram showing information on the behavior of the user detected by utilizing the position of the user in the house.

The model management unit 4031 generates and updates the behavior model of the user 10 based on behavior information of the user 10 collected by collecting server 300. Here, the behavior of the user will be described. Behavior information of the user 10 shown in FIG. 4 is exemplified when the position of the user 10 in the building 50, which is the house, is used. In FIG. 4, two behavior information are shown in the upper part (a) and the lower part (b). In the illustrated example, the horizontal axis represents time, and the vertical axis represents the location of the human sensor that has detected the user 10. That is, the illustrated behavior of the user 10 is a time-series representation of the position of the user 10 within the building 50.

In the example shown in the upper stage (a) of FIG. 4, the user 10 returns home at 18:00 on a certain weekday, and it is detected by the entry and exit detection sensor. The user 10 then moves from the bathroom to the kitchen where he makes a meal and eats dinner. Thereafter, it is shown that the user 10 has been bathed after spending in the living room. On the other hand, in the example of the lower part (b), the user 10 returns home on another weekday at 20:00, and this is detected by the entry and exit detection sensor. Thereafter, the user 10 is shown to have moved from the bathroom to the living room, where after spending a certain period of time, the bathing has begun. As described above, there may be a plurality of patterns in the way the user 10 spends in the building 50, and in the present embodiment, the pattern of the upper row (a) is the pattern of the "weekday A" and the pattern of the lower row (b) is the pattern of the "weekday B".

Figure 5:
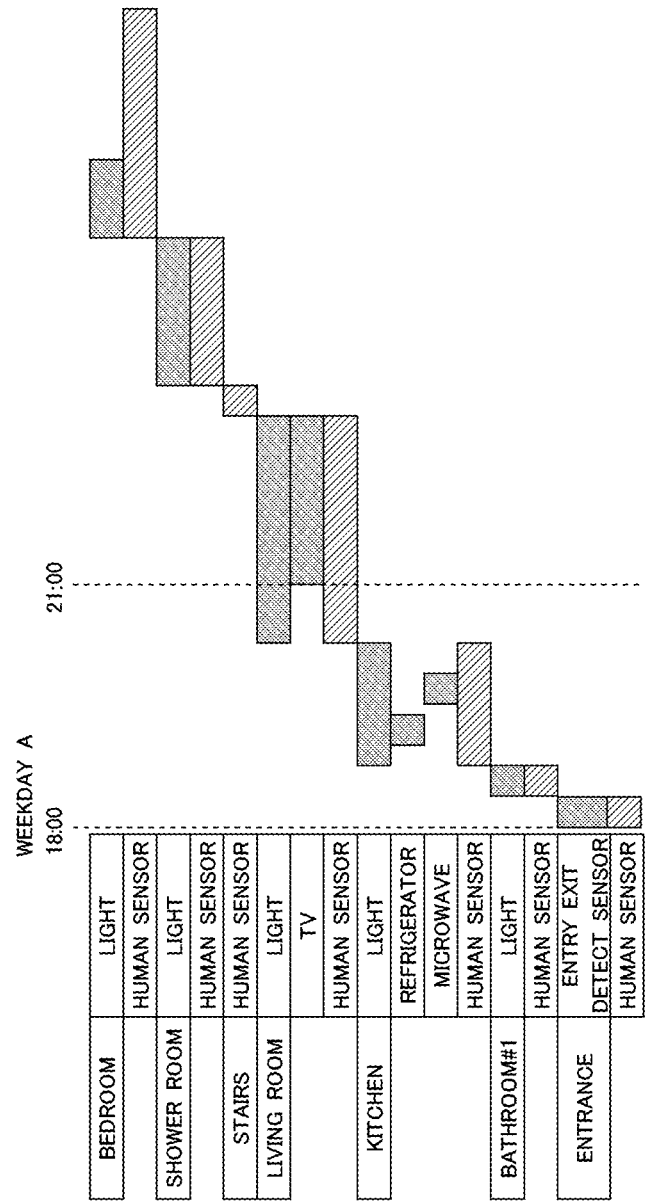
FIG. 5 is a diagram showing information on the behavior of the user detected by utilizing the position of the user in the house and information on the apparatus in the house.

Next, another embodiment of behavior information of the user 10 is shown in FIG. 5. Behavior information of the user 10 shown in FIG. 5 is exemplified when the position of the user 10 in the building 50, which is the home, is used and the data on the device used in the building 50 is used. In the illustrated example, the human sensors, the device sensors in addition to the entry and exit detection sensor are shown. That is, the behavior of the user 10 shown in FIG. 5 is a time-series representation of the position of the user 10 in the building 50 and the usage of the devices by the user 10. In the form shown in FIG. 5, although there may be a plurality of patterns for the user to spend, only behavior information corresponding to the weekday A pattern shown in the upper part (a) of FIG. 4 is shown in FIG. 5.

Looking at behavior information shown in FIG. 5, we can understand not only which room the user 10 is staying in, but also what behaviors they take in the room where they are staying. For example, it is inferred that the user 10 who moved to the kitchen made dinner and consumed meals in the kitchen by using a refrigerator or a microwave oven. In addition, it is inferred that the user 10 watched the television in the living room. By utilizing such device data, it is easy to understand the behavior pattern of the user within the building 50.

Here, if the user 10 repeats the action of either weekday A or weekday B according to the weekday day, the behavior pattern of the user 10 on that day may be identified from the plurality of behavior patterns included in the behavior model (the identification of this behavior pattern is performed by the pattern identifying unit 4032 described later). In this case, it is possible to predict the time at which the user 10 should arrive at the building 50, which is the home, from the place of departure. Behavior model stored by the server 400 is the time series representation of behavior pattern that contributes to the prediction of the arrival time of the user 10 to the building 50. In the illustrated example, the presence or absence of the user 10 or the use of the device is represented by binary values, but higher-dimensional data may be used. For example, the number of times of sensing in a unit time may be used as the data obtained from the human sensor.

Further, the behavior model is not limited to data relating to the behavior of the user within the building 50, but may include any data that contributes to predicting the arrival time to the building 50. For example, a behavior pattern may be included in the behavior model that includes actions taken by the user 10 prior to reaching the building 50, such as, for example, visiting a food store to buy dinner foodstuffs. The behavior of the user 10 outside the building 50 can be grasped by using the position information detected by the position detecting unit 23 of mobile terminal 20 carried by the user 10. An example of the information on the behavior taken by the user 10 before reaching the building 50 is shown in FIG. 11, which will be described later.

Here, the generation and updating of behavior model by the model management unit 4031 will be described in detail. The model management unit 4031 acquires behavior information (detection data detected by sensor group 200) of the user 10 transmitted from collecting server 300, and updates behavior model stored in storage unit 402 by using the timing (timing at which the user 10 leaves the building 50) as a trigger. More specifically, the model management unit 4031 converts a plurality of pieces of transmitted detection data into time-series data. The time series data may be, for example, array data having the sensor type and time in components and the values obtained by sensing stored. The time-series data can be obtained by converting detection data corresponding to a predetermined period in the past.

For example, when the user 10 goes out in the morning, the model management unit 4031 converts the detection data acquired during the period from returning home on the previous day to going out in the morning into time-series data, and updates the behavior model using the time-series data. Behavior model may be a machine-learning model, or may be a model statistically representing relationships between a plurality of actions performed in the buildings 50 and the time of return. Behavior model may be in any form that represents the user's behavior pattern. When behavior model is a machine-learning model, the time-series data may be converted into feature data, and then learning may be performed using the feature data as input data and the outing time as teacher data. In the present embodiment, it is assumed that a behavior model including two behavior patterns corresponding to behavior information shown in FIG. 4 is generated and updated by the model management unit 4031.

Next, the pattern identifying unit 4032 is a functional unit that uses the behavior model stored in storage unit 402 to identify the behavior pattern of the user 10 at that time. For example, when two behavior patterns based on behavior information shown in FIG. 4 are included in the behavior model, the pattern identifying unit 4032 identifies whether the behavior pattern of the user 10 at that time is a pattern of weekday A or weekday B. When identifying a behavior pattern, the identification may be performed based on the date and time information at the time of the identification, the present position information of the user, and the like. The predicting unit 4033 predicts the time (scheduled arrival time) at which the user 10 will arrive at the building 50 based on behavior pattern identified by the pattern identifying unit 4032. That is, when the behavior of the user inside or outside the building 50 is patterned, a certain correlation can be found between the behavior pattern and the time at which the user 10 wants to arrive at the building 50, and therefore the predicting unit 4033 predicts scheduled arrival time by using the correlation.

The providing unit 4034 is a functional unit that provides movement information for allowing the user 10 to arrive at the building 50 by the scheduled arrival time predicted by the predicting unit 4033 to mobile terminal 20 of the user 10. The movement information may include, for example, information relating to at least one of a moving tool for the movement, such as a vehicle, a public institution, or a walk, a movement starting time at which the vehicle starts moving toward the building 50, and a travel route to the building 50, but may include other useful information. The destination of the movement information provided by the providing unit 4034 is not limited to mobile terminal 20, and the movement information may be provided to another terminal as long as the movement information can be accessed by the user 10 (e.g., a fixed terminal or the like disposed at the work facility of the user 10). In addition, arrangement unit 4035 generates an instruction for dispatching the vehicle 500 for the user 10 to move to the building 50 in accordance with the response from the user 10 to the movement information provided by the providing unit 4034, and transmits the instruction to the vehicle 500. The vehicle 500 which has received the instruction performs the transporting of the user 10 by the automatic operation in accordance with the instruction content.

Next, the input/output unit 404 is an interface for inputting and outputting information. The input/output unit 404 includes, for example, a display device and a touch panel. The input/output unit 404 may include keyboards, near field communications, touch screens, etc.

Here, the components of the mobile terminal 20 included in the user 10 will be described. Mobile terminal 20 includes a communication unit 21, an input/output unit 22, and the position detecting unit 23 as functional units, but may include other functional units. The communication unit 21 is a communication interface for connecting the mobile terminal 20 to a network, and includes, for example, a network interface board and wireless communication circuits for wireless communication. The input/output unit 22 is a functional unit for displaying information or the like transmitted from the outside via communication unit 21 and inputting the information when transmitting the information to the outside via communication unit 21, and is configured to have, for example, a display device or a touch panel. Position detecting unit 23 is a functional unit for detecting the position of mobile terminal 20 is formed with, for example, a GPS device.

Figure 6:
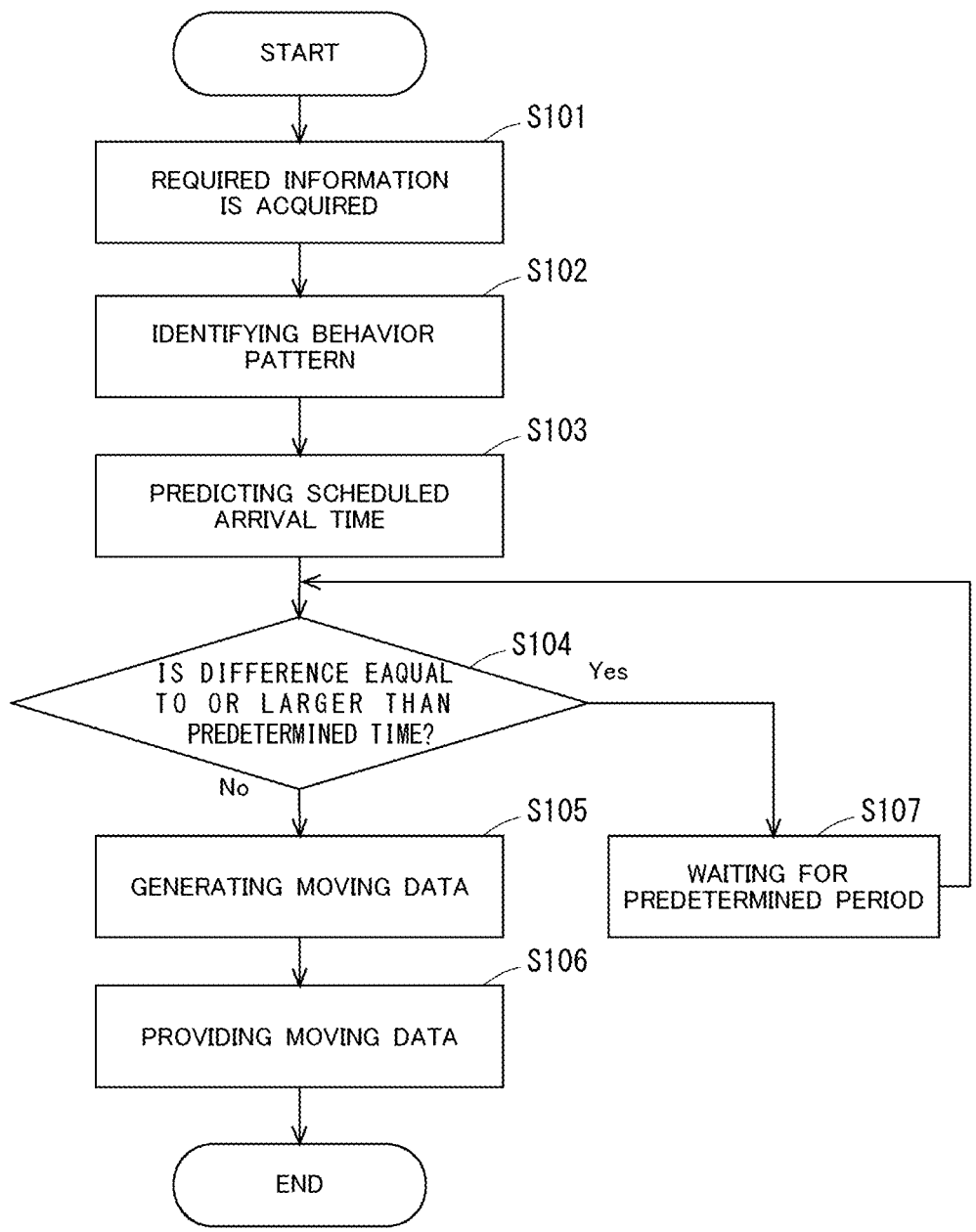
FIG. 6 is a flowchart for providing the user with information about the movement.

Here, the movement information providing process by the server 400 will be described with reference to the flowchart shown in FIG. 6. The providing process is executed by controller 403. First, in S101, information required to provide moving information is acquired. More specifically, the present position and present time of the user 10 are acquired. The present position of the user 10 can be obtained by transmitting the position information detected by the position detecting unit 23 of mobile terminal 20 of the user 10 to the server 400. When the process of S101 is completed, the process proceeds to S102.

In S102, the pattern identifying unit 4032, behavior pattern of the user 10 at that time, that is, a behavior pattern relating to the movement of the user to the building 50 is identified using the behavior model stored in storage unit 402. First, as shown in FIG. 4 and FIG. 5, the behavior model is generated based on the detection data detected by the group of sensors 200 provided in the building 50, and the behavior model includes two behavior patterns (two patterns of weekday A and weekday B). The behavior model was generated based on the actions taken by the user 10 after arriving at the building 50. Thus, the two behavior patterns contained in the behavior model reflect the behavior that the user 10 repeatedly performs within the building 50.

The pattern identifying unit 4032 identifies a behavior pattern based on the present time and the present position of the user 10. For example, in case that the pattern of weekday A and the pattern of weekday B are divided by the day of the weekday, behavior pattern taken by the user at the present time can be identified to either the pattern of weekday A or the pattern of weekday B based on the current day of the weekday. On the other hand, if the user's current position is too far to arrive at the building 50 by 18:00 even though the current day of the weekday is the day of the weekday corresponding to the pattern A on weekdays, the behavior pattern of the user can be identified to the pattern B on weekdays.

Alternatively, a case where the behavior model stored in the storage unit 402 includes behavior patterns generated by information on behavior (detection data detected by the position detection unit 23) by the user 10 outside the building 50 which is acquired by mobile terminal 20 will be described. For example, there may be a behavior pattern in which the user 10 visits a predetermined building (such as a food store for purchasing food or a nursery school in which a child is entrusted) prior to arriving at the building 50 which is the home. In each behavior pattern, the user 10 arrives at the building 50 at a predetermined time (e.g., 18:15 minutes). Then, when the user 10 is located at the place which is recorded in the behavior pattern at the time which is recorded in the behavior pattern, the pattern identifying unit 4032 can identify the user's behavior pattern.

When behavior pattern is identified by S102, the predicting unit 4033 predicts the time (scheduled arrival time) at which the user 10 will arrive at the building 50 (S103). In the above example, when the identified behavior pattern is weekday A, scheduled arrival time is predicted to be 18:00, and when it is weekday B, scheduled arrival time is predicted to be 20:00. If the identified behavior pattern is identified as a behavior pattern where the user comes to a predetermined building prior to returning home, the scheduled arrival time is predicted to be 18:15. That is, the scheduled arrival time predicted by the predicting unit 4033 reflects the time of arrival at the building 50 (home return time) set in the identified behavior pattern. When the process of S103 is completed, the process proceeds to S104.

In S104, it is determined whether or not the difference between the scheduled arrival time predicted by S103 and the present time is equal to or larger than predetermined time. If the scheduled arrival time is much earlier than the present time, then there is a greater chance that something will happen and the user's 10 behavior will deviate from behavior pattern. If the difference between the scheduled arrival time and present time is equal to or greater than predetermined time, S105 and subsequent processes described later are suspended. That is, if an affirmative determination is made in S104, the provision of moving information from the server 400 to the mobile terminal 20 is suspended. If an affirmative determination is made in S104, the process proceeds to S107, and the process waits for a predetermined period of time. The waiting time is a time when the difference between scheduled arrival time and present time becomes less than the predetermined time at the timing when the process of S104 is performed again.

If a negative determination is made in S104, the process proceeds to S105. In S105, the providing unit 4034 generates movement information. The movement information is information relating to the movement of the user 10 from the current position to the building 50, and is information for allowing the user 10 to arrive at the building 50 by the scheduled arrival time predicted by S103. The movement information of the present embodiment includes, for example, a "return route" which is a route traveled at the time of movement, a "means" for movement, a "departure time" (movement starting time) which allows arriving at the building by the scheduled arrival time, traffic information related to movement, and a "delay possibility" related to the possibility of delay.

Details of the generation of the movement information will be described with reference to FIGS. 7 and 8. FIG. 7 is a diagram for explaining a travel route from the present position of the user 10 to the building 50, and FIG. 8 is a diagram showing the moving information provided by S106 described later state on input/output unit 22 of mobile terminal 20. Further, from FIG. 8, it is possible to understand the data structure of the movement information. In the "return route" in the movement information, in the present embodiment, three routes R1 to R3 as travel routes of the vehicle 500 from the current position to the building 50, and a route for moving from the current position to the building 50 using a railway are extracted. Travel route by the vehicle 500 can be extracted from various perspectives. For example, travel routes by the vehicle 500 can be extracted from the viewpoint of the route where the travel distance is the shortest, the route where the toll road is used, the route where the toll road is not used, and so on. Travel route R1 has the longest travel route among the three routes, but no special circumstances such as traffic congestion or roadway construction have occurred in the middle of the route. Travel route R2 has the shortest travel route among the three routes, but traffic congestion occurs in the middle of the route. Travel route R3 has the second longest travel route among the three routes, but roadworks are occurring in the middle of the route. Information on traffic congestion and road construction is acquired by the server 400 by accessing an external device to which the information is distributed. In addition, when the use of railways is useful for moving from the present position to the buildings 50 in order to meet the scheduled arrival time, the information of the railways that can be used for the "return route" is shown as in the present embodiment.

In addition, in this embodiment, vehicles and railroads are indicated as moving means corresponding to the above-mentioned respective travel route in the "means" of the moving information.

Then, the providing unit 4034 calculates the time (time at which the movement should be started) at which the user 10 should depart from the present position in order to be able to arrive at the building 50 by the scheduled arrival time (18:00, which is the scheduled home return time in the present embodiment) considering the circumstances related to such travel routes. For example, since no traffic congestion, road construction, or the like occurs in travel route R1, the time required for traveling is calculated on the basis of the distances of travel route R1 and the assumed standard speeds of the vehicles 500, and the departure time is calculated in accordance with the calculated standard speeds. With regard to travel route R2 and travel route R3, the time required for travel on each route is calculated based on the distance between travel route R2 or R3 and the assumed standard speed of the vehicle 500, taking into an account the amount of impact on traffic congestion and road construction, and the departure time is calculated accordingly, considering whether traffic congestion or road construction is occurring. Based on the above, in the moving data of the present embodiment, the "departure times" corresponding to travel route R1, R2, and R3 are 17:15, 16:40, and 17:00, respectively. In the case where the moving means is a railway, the time corresponding to the departure time from the nearest station of the train to be used is indicated by "departure time" in the movement information, which is the movement start time from the current position.

The "traffic information" in the travel information indicates information on traffic congestion and road construction in travel route. As described above, the information can be obtained from an external device by the server 400. When the moving means is a railway, information on the train delay may be indicated as "traffic information". In addition, the "delay possibility" in the travel information indicates the degree of possibility that the vehicle will not be able to reach the building 50 by the scheduled arrival time in view of the circumstances indicated in the "traffic information". In the present embodiment, it is indicated that the possibility of delay is high in view of the magnitude of the traffic congestion occurring in travel route R2.

As described above, in S105, when the providing unit 4034 generates the movement information having the "return route", "means", "departure time", "traffic information" and "delay possibility", the generated movement information is provided by the providing unit 4034 to the user's mobile terminal 20 (S106 process). The screen displayed on the input/output unit 22 of the mobile terminal 20 to which the movement information is provided is the screen shown in FIG. 8. The user 10 who has received such movement information is provided with movement information that is useful in order that the user 10 can arrive at his/her home (building 50) by the return time (scheduled arrival time) in which his/her own behavior pattern is considered. In this embodiment, the user 10 does not enter the scheduled arrival time by itself. Thus, a mobile service with very high user convenience is provided. For example, when a user is doing something, the time to go home may be forgotten. However, as described above, if the movement information is automatically provided from the server 400 to the mobile terminal 20, the user's attention can be drawn, and the usefulness of the service can be said to be extremely high.

Here, as can be seen from FIG. 8, the "arrangement" button is arranged below the screen displayed on mobile terminal 20. That is, the movement information provided by the providing unit 4034 includes information relating to arrangement of the vehicle 500 for realizing the movement when the moving unit is a vehicle. If the user 10 viewing the movement information wishes to move by the vehicle 500 according to a travel route of the travel routes presented, the user 10 may enter a selection symbol (checkbox) in the checkbox at the left end of the screen and then press the "arrangement" button. As a result, the mobile terminal 20 requests the server 400 to dispatch the vehicle 500.

Figure 9:
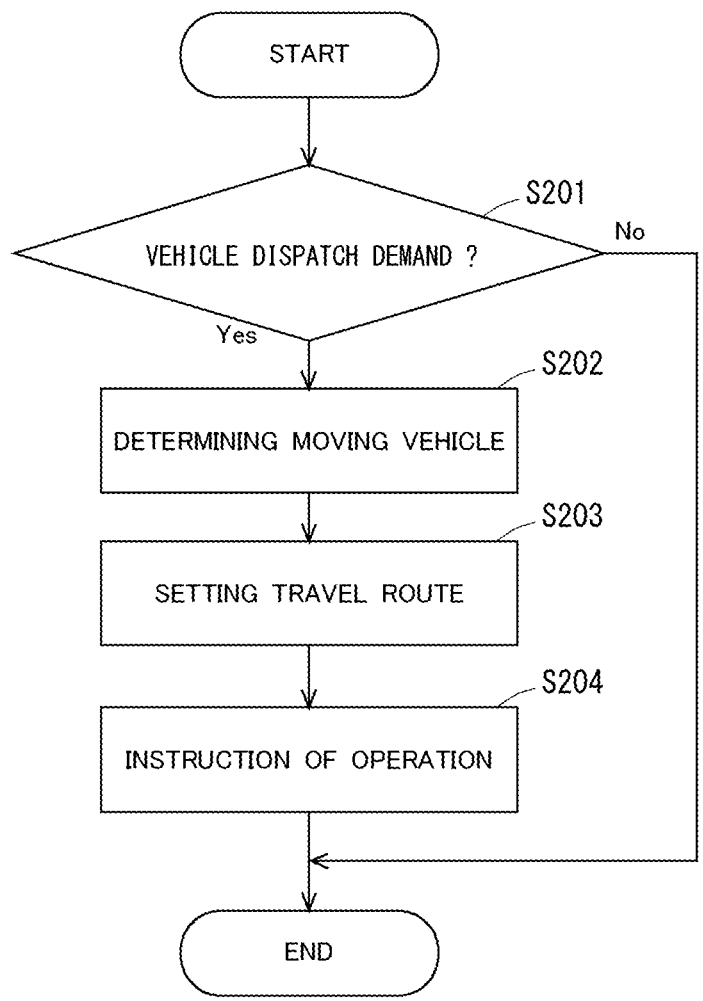
FIG. 9 is a flowchart for processing the device request from the user.

In the server 400 that has received the vehicle dispatch request, the arrangement unit 4035 performs an arrangement process of the vehicle 500 in accordance with the request content. Here, arrangement process by the arrangement unit 4035 will be described with reference to the flow chart shown in FIG. 9. First, in S201, it is determined whether or not there is a vehicle dispatch demand from the user 10. If an affirmative determination is made in S201, the process proceeds to S202, and in S202, the vehicle 500 suitable for the vehicle dispatch request from the user 10 is determined. For example, the vehicle 500 which is located in order to enable to pick up the user 10 at the current location of the user 10 by the departure time corresponding to travel route selected by the user 10 is determined as the vehicle 500 capable of responding to the dispatch request. When the moving vehicle is determined, the current position of the user 10 and the information of travel route selected by the user 10 are set in the vehicle 500 as information relating to the movement of the user 10 from the current position to the buildings 50 (S203 process). The vehicle 500 capable of automatic operation will be operated according to the set travel route. Then, the vehicle 500 by arrangement unit 4035 in S204, an instruction of the automatic operation is issued. The instructed vehicle 500 moves to the present position of the user 10, picks up the user 10, and then moves to the building 50 according to travel route selected by the user 10.

By the dispatch process of the vehicle 500 that can be automatically driven is performed, the user 10 can easily arrange for the vehicle 500 that can travel to the building 50 by scheduled arrival time, and also arrive at the building 50 by that time. Therefore, it can be said that the convenience of the mobile service received by the user 10 is extremely high.

Modification 1 of the First Embodiment

A first modification of the first embodiment will be described with reference to FIG. 10. FIG. 10 shows an example of displays displayed on the input/output unit 22 of the mobile terminal 20 when the movement information of the present modification is provided to the mobile terminal 20 by the providing unit 4034. In this modification, since for some reason the pattern identifying unit 4032 could not identify a single behavior pattern of the user 10, it is assumed that a plurality of behavior patterns among behavior patterns included in the behavior model may be identified. In the case shown in FIG. 10, two behavior patterns included in the behavior model are identified.

In such cases, as shown in FIG. 10, the providing unit 4034 provides the movement information so that the movement information corresponding to the respective behavior pattern can be compared by the input/output unit 22 of the mobile terminal 20. That is, the movement information is displayed in a comparable format in the input/output unit 22. In the form shown in FIG. 10, the movement information corresponding to the pattern on weekdays A is shown in the upper row, and the movement information corresponding to the pattern on weekdays B is shown in the lower row. Thus, by displaying the movement information for each behavior pattern side by side in this way, the range of choices for the user 10 to move to the building 50 can be expanded, and the convenience of the moving service by the server 400 can be improved.

Alternatively, when a plurality of behavior patterns are identified, only the movement data of a behavior pattern having the earliest scheduled arrival time may be displayed. In this manner, the user can be alerted to move to the building 50.

Modification 2 of the First Embodiment

A second modification of the first embodiment will be described. In this modification, with respect to the prediction of scheduled arrival time of the predicting unit 4033, using the behavior model generated based on the detection data by the device sensor provided in the device in the building 50 as shown in FIG. 5, the scheduled arrival time may be predicted so that the operation using the device included in the behavior pattern can be started by a first predetermined time. For example, as can be seen from behavior information shown in FIG. 5, the user 10 has a behavior pattern to watch the TV in the living room at 21:00 (first predetermined time). From this, it is inferred that the user has a television program that he wants to watch at 21:00. Therefore, the predicting unit 4033 may predict the time (e.g., 20:50) in time for the TV program as scheduled arrival time. In this manner, by predicting scheduled arrival time and providing travel information, the user 10 can arrive at the building 50 at least in time to watch the program on the TV.

As for the prediction of the scheduled arrival time by the predicting unit 4033, as an alternative, the scheduled arrival time is predicted so that the operation using the device included in the behavior pattern can be terminated by a second predetermined time using the behavior model generated based on the detection data by the device sensor provided in the equipment in the building 50 as shown in FIG. 5, and the operation using the equipment included in the behavior pattern can be terminated by the second predetermined time. As in the case described above, it is assumed that the user 10 has a television program that he/she wants to watch at 21:00. Here, from the behavior information shown in FIG. 5, the user 10 has patterns of eating dinner in a living room prior to TV viewing. Therefore, the time at which the user 10 can finish dinner by 20:50 (the second predetermined time) before watching TV, for example 20:00 considering a minimum dinner time, may be predicted as the scheduled arrival time. By predicting the scheduled arrival time and providing the travel information in this manner, the user 10 can arrive at the building 50 in time to watch the program on the TV after completing dinner.

Modification 3 of the First Embodiment

A third modification of the first embodiment will be described. In the embodiments described above, the building 50 is a home in which the user 10 resides, but instead, the building 50 may be a facility of a company in which the user 10 performs business. That is, if the building is a building where the user 10 spend times to the extent that the behavior pattern of the user 10 can be formed, it is possible to receive the provision of information on the movement to the building in the same manner as in the embodiments described above.

Second Embodiment

The second embodiment will be described with reference to FIGS. 11 to 13. FIG. 11 represents behavior information taken by the user 10 outside the building 50, which is used to generate behavior model. Behavior information shown in FIG. 11 is generated from position data detected by the position detecting unit 23 of the mobile terminal 20 of the user 10. In FIG. 11, the behavior information includes information on a facility (building) in which the user 10 visits in a certain time period prior to the user 10 arriving at the building 50, and has fields of "date", "day of the week", "visiting facility" and "stay time". "Date" indicates the date information on which the visit was made, and "Day of the week" indicates the day of the week information on which the visit was made. In the present embodiment, the day of the week information corresponding to the weekday A pattern is shown as "weekday A" and the day of the week information corresponding to the weekday B pattern is shown as "weekday B". The "visiting facility" indicates information of the facility where the user 10 has visited. The "stay time" indicates information on the stay time of the visited facility.

In generating the moving information from the current location of the user 10 to the building 50, the providing unit 4034 of the present embodiment determines whether or not to go to a different building (facility) prior to reaching the building 50, based on the behavior pattern identified by the pattern identifying unit 4032. For example, when the pattern identifying unit 4032 identifies the behavior pattern as a pattern of weekday A, referring to behavior information in FIG. 11, where the day of the week corresponding to the weekday A pattern is input in the "day of the week" field, it can be seen that the user 10 is at the facilities X, Y, and Z. Therefore, in such a case, the providing unit 4034 provides, as the movement information, route information from the current position to the building 50 via the visiting facilities X, Y, and Z.

Figure 12:
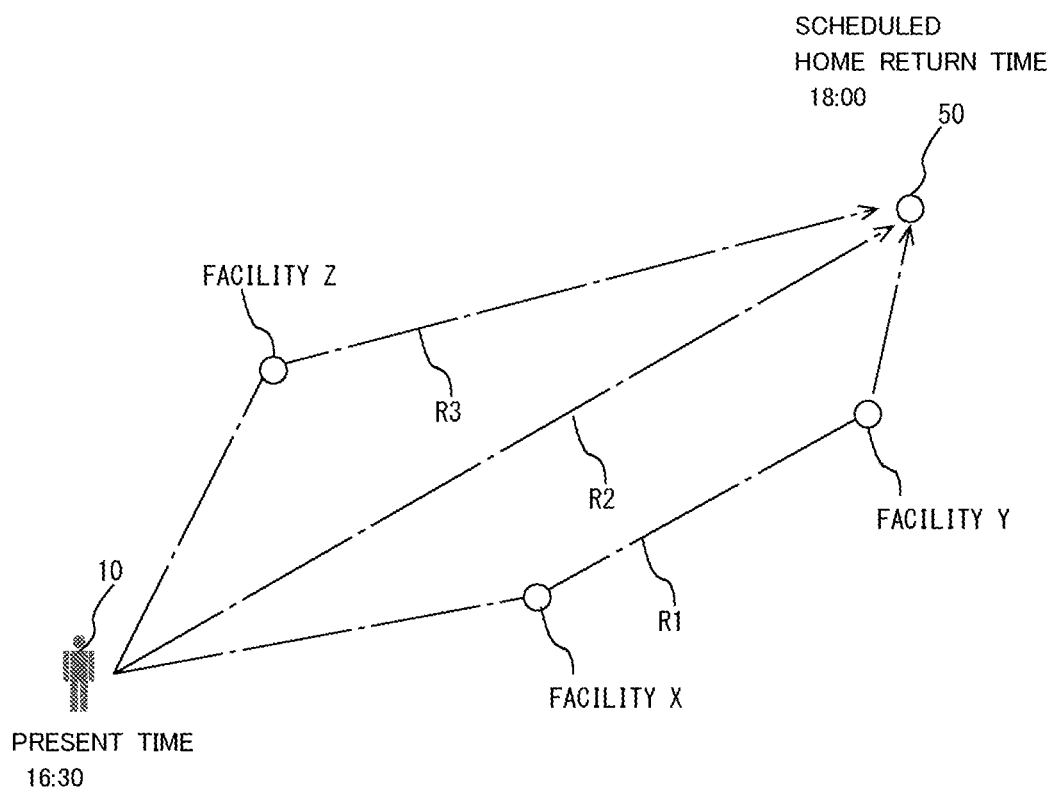
FIG. 12 is a second diagram for explaining travel route to home provided to the user.

Here, in the present embodiment, as shown in FIG. 12, it is assumed that the facility X and the facility Y are located on the route R1, and the facility Z is located on the route R3. Considering the positions of the respective facilities, the providing unit 4034 generates movement information to be displayed on the mobile terminal 20 as shown in FIG. 13. Specifically, the movement information of the present embodiment includes the "return route", "means", and "departure time" as in the above-described embodiments, and further includes the "departure facility" and the "departure time".

In the visiting facility of the movement information, information on one or more facilities in which the user is supposed to visit is indicated considering a corresponding travel route. As described above, since the facility X and the facility Y are located on the travel route R1, in the moving data corresponding to the travel route R1, these facilities are displayed on the "visiting facility", but the facility Z is not displayed. On the other hand, since the facility Z is located on the travel route R3, the facility Z is displayed on the "visiting facility" in the moving data corresponding to the travel route R3, but the facility X and the facility Y are not displayed. In the travel route R2, since a facility where the user 10 can visit from the behavior information cannot be found, no facility is displayed on the "visiting facility".

In addition, the "visiting time" in the movement information indicates a visiting time during which the user can stay at the facility indicated in the "facility". The stay time in behavior information is determined by considering the "stay time" of the user 10. Then, the "departure time" in the moving information is determined so that the arrival at the building 50 is in time for the predicted scheduled arrival time, and also considering the time to stop at the visiting facility.

When the movement information is generated by the providing unit 4034 and the movement information is provided to the mobile terminal 20 of the user 10 in this manner, the user 10 is provided with movement information that allows the user to reach the home (building 50) by the return time (scheduled arrival time) in which his/her own behavior pattern including the visit to the facility is considered. At this time, since the user 10 does not enter scheduled arrival time by itself, a highly convenient mobile service is provided for the user. Further, in the present embodiment as well, the arrangement unit 4035 performs a vehicle allocation process of the vehicle 500 capable of automated driving by responding to "arrangement requests" to the server 400 in response to the presented movement information. Consequently, the user 10 can easily utilize the vehicle 500 that is movable to the building 50 by scheduled arrival time after visiting the facility. From this point of view, it can be said that the convenience of the mobile service received by the user 10 is extremely high.

<Other Variations>

The above embodiment is merely an example, and the scope disclosure may be appropriately modified and practiced without departing from the gist thereof. For example, the processing and means described in the present disclosure can be freely combined and implemented so long as technical inconsistencies do not occur.

Furthermore, a process that is described to be performed by one apparatus may be shared and performed by a plurality of apparatuses. For example, the model management unit 4031 may be formed in an arithmetic processing unit different from the server 400. At this time, the other arithmetic processing unit may be configured to cooperate with the server 400. Further, the processing described as being performed by different apparatuses may be executed by one device. Which function is to be implemented by which hardware configuration (server configuration) in a computer system may be flexibly changed.

The present disclosure may also be implemented by supplying computer programs for implementing the functions described in the embodiments described above to a computer, and by one or more processors of the computer reading out and executing the programs. Such computer programs may be provided to the computer by a non-transitory computer-readable storage medium that can be connected to a system bus of the computer, or may be provided to the computer through a network. The non-transitory computer-readable storage medium may be any type of disk including magnetic disks (floppy (registered trademark) disks, hard disk drives (HDDs), etc.) and optical disks (CD-ROMs, DVD discs, Blu-ray discs, etc.), read-only memories (ROMs), random access memories (RAMs), EPROMs, EEPROMs, magnetic cards, flash memories, optical cards, and any type of medium suitable for storing electronic instructions.

What is claimed is:

1. An information processing apparatus comprising:
a storage device; and
a controller, wherein
the controller is configured to execute:
collecting behavior information of a user, the behavior information being first position information of the user outside of a building detected by a position detecting sensor provided in a mobile terminal of the user during a period until the user has arrived at the building,
in response to detecting that the user has arrived at the building based on the first position information, generating a behavior model of the user, the behavior model being a first time-series representation of a position of the user outside of the building in which an arrival time of the user at the building is recorded based on the first position information, by converting the first position information into time series data,
storing the behavior model in the storage device,
after the behavior model has been stored in the storage device, acquiring second position information of the user outside of the building detected by the position detecting sensor,
identifying a behavior pattern of the user using the behavior model of the user based on a present time and a present position of the user including the second position information, the behavior pattern being a second time-series representation of the position of the user outside of the building,
predicting a scheduled arrival time, which is an arrival time of the user at the building to which the user travels based on the behavior pattern,
calculating a travel route from the present position to the building, determining a mode of transportation for moving on the travel route, and calculating a movement starting time at which the mode of transportation is to start-moving from the present position to the building on the travel route based on the travel route, the mode of transportation, the present time, and the scheduled arrival time, so that the user can arrive at the building by the scheduled arrival time, and
providing the user with information regarding movement to the building, including at least the travel route, the mode of transportation, and the movement starting time.

2. The information processing apparatus according to claim 1, wherein
the controller is configured to calculate the travel route to the building based on traffic conditions between the present position of the user and the building.

3. The information processing apparatus according to claim 1, wherein the behavior pattern includes a plurality of behavior patterns of the user using the behavior model of the user based on the present time and the present position including the second position information, and
the controller is configured to:
identify the plurality of behavior patterns,
predict a plurality of scheduled arrival times, and
display the information relating to the movement to the building corresponding to each of the plurality of scheduled arrival times side by side.

4. The information processing apparatus according to claim 3, wherein
the controller is configured to predict the scheduled arrival times based on each of the behavior patterns when the plurality of the behavior patterns are identified, and to provide information to the user regarding the movement to the building based on an earliest scheduled arrival time among the predicted scheduled arrival times.

5. The information processing apparatus according to claim 1, wherein
the controller is configured to suspend providing the information to the user regarding the movement to the building when a difference between the scheduled arrival time and the present time is greater than or equal to a predetermined time.

6. The information processing apparatus according to claim 5, wherein
the controller is configured to provide the information to the user regarding the movement to the building when the difference between the scheduled arrival time and the present time is less than the predetermined time.

7. The information processing apparatus according to claim 1, wherein
the controller is further configured to provide information regarding an arrangement of a vehicle as information regarding the movement to the building.

8. The information processing apparatus according to claim 7, wherein
the controller is configured to move the vehicle to the present position of the user upon a request from the user to arrange the vehicle, and to provide the information to the vehicle regarding the movement to the building which was provided to the user.

9. The information processing apparatus according to claim 1, wherein
the controller is configured to provide route information to the building via a different building as the information regarding the movement to the building when it is determined that the user travels to the building via the different building.

10. The information processing apparatus according to claim 9, wherein
the controller is configured to determine that the user will travel to the building via the different building based on the behavior pattern.

11. The information processing apparatus according to claim 1, wherein
the controller is configured to provide route information to the building via a plurality of different buildings as the information regarding the movement to the building when it is determined that the user travels to the building via the plurality of different buildings.

12. An information processing method executed by a computer, including:
collecting behavior information of a user, the behavior information being first position information of the user outside of a building detected by a position detecting sensor provided in a mobile terminal of the user during a period until the user has arrived at the building;
in response to detecting that the user has arrived at the building based on the first position information, generating a behavior model of the user, the behavior model being a first time-series representation of a position of the user outside of the building in which an arrival time of the user at the building is recorded based on the first position information, by converting the first position information into time series data;
storing the behavior model in a storage device of the computer;
after the behavior model has been stored in the storage device, acquiring second position information of the user outside of the building detected by the position detecting sensor;
identifying a behavior pattern of the user using the behavior model of the user based on a present time and a present position of the user including the second position information, the behavior pattern being a second time-series representation of the position of the user outside of the building;
predicting a scheduled arrival time of the user at the building to which the user travels based on the behavior pattern;
calculating a travel route from the present position to the building, determining a mode of transportation for moving on the travel route, and calculating a movement starting time at which the mode of transportation is to start-moving from the present position to the building on the travel route based on the travel route, the mode of transportation, the present time, and the scheduled arrival time, so that the user can arrive at the building by the scheduled arrival time; and
providing the user with information regarding movement to the building including at least the travel route, the mode of transportation, and the movement starting time.

* * * * *

UNITED STATES PATENT AND TRADEMARK OFFICE
CERTIFICATE OF CORRECTION

PATENT NO. : 11,686,591 B2
APPLICATION NO. : 17/130396
DATED : June 27, 2023
INVENTOR(S) : Yurika Tanaka Page 1 of 1

It is certified that error appears in the above-identified patent and that said Letters Patent is hereby corrected as shown below:

In the Claims

In Column 16, Line 36 after "predicting a scheduled arrival time" please delete ", which is an arrival time".

Signed and Sealed this
Twenty-seventh Day of February, 2024

Katherine Kelly Vidal
*Director of the United States Patent and Trademark Office*